United States Patent [19]
Hüper et al.

[11] 3,897,409
[45] July 29, 1975

[54] FREEZE CONCENTRATION OF AQUEOUS SOLUTIONS OF HEAT-LABILE SUBSTANCES

[75] Inventors: Fritz Hüper, Wuppertal-Vohwinkel; Günther Schmidt-Kastner, Wuppertal-Elberfeld, both of Germany

[73] Assignee: Bayer Aktiengesellschaft, Leverkusen, Germany

[22] Filed: Jan. 26, 1973

[21] Appl. No.: 327,108

[30] Foreign Application Priority Data
Feb. 1, 1972 Germany............................ 2204598

[52] U.S. Cl. ............... 260/112.5; 424/74; 424/177; 260/112; 260/210
[51] Int. Cl.$^2$..................................... C07C 103/52
[58] Field of Search..................... 424/74; 260/112.5

Primary Examiner—Elbert L. Roberts
Attorney, Agent, or Firm—Depaoli & O'Brien

[57] ABSTRACT

The disclosure relates to a novel process for the freeze concentration of aqueous solutions of heat-labile substances which includes the steps of cooling a crude aqueous solution of heat-labile substance to produce a frozen crude solution and a pre-cooled crude solution of said heat-labile substance, mixing said frozen crude solution and said pre-cooled solution with ice, to produce pure ice crystals and a first concentrated solution of said heat-labile substance and subsequently separating said pure ice crystals from said first concentrated solution of said heat-labile substance. The disclosure further describes the additional steps of further cooling said first concentrated solution to form further ice crystals and a second concentrated solution of said heat-labile substance and subsequently separating said further ice crystals from said second concentrated solution of said heat-labile substance.

13 Claims, 1 Drawing Figure

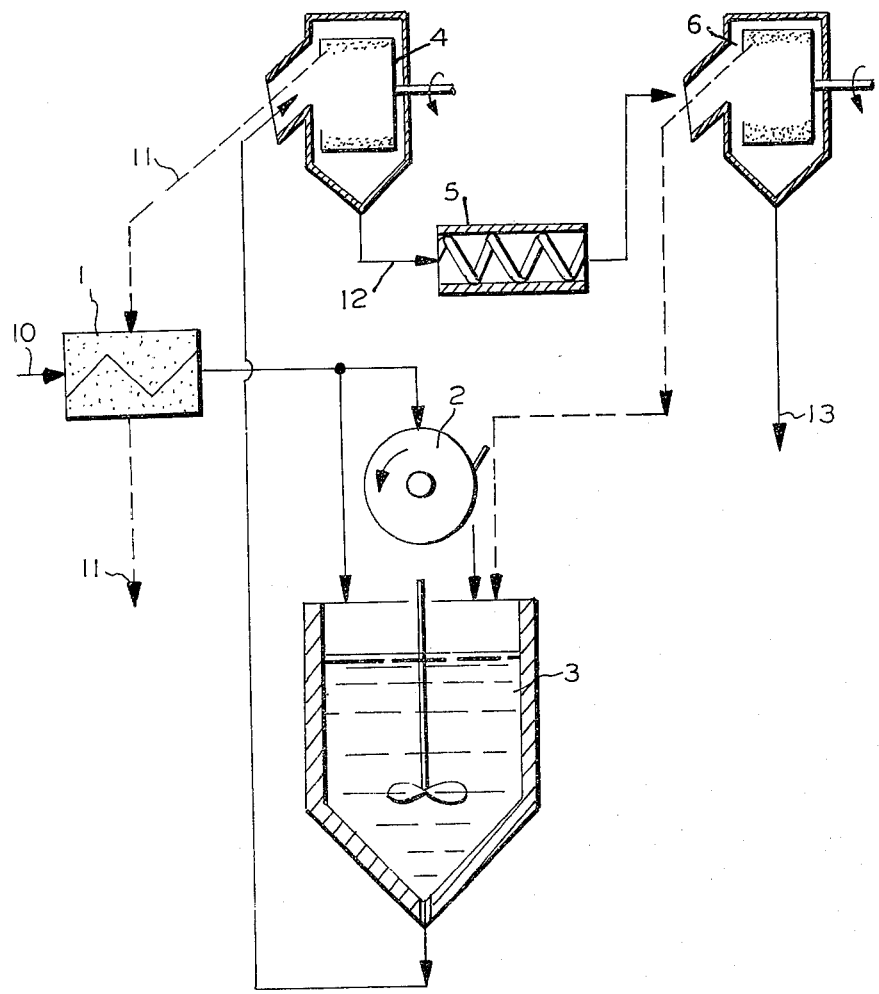

FREEZE CONCENTRATION OF AQUEOUS SOLUTIONS OF HEAT-LABILE SUBSTANCES

BACKGROUND OF THE INVENTION

To a substantial extent, vacuum evaporators are presently employed for the large-scale industrial concentration of aqueous solutions [Ullmanns Enzyklopadie der technischen Chemie (Ulmanns Encyclopedia of Industrial Chemistry), Munich-Berlin, 1, (1951) 529]. In thermal concentration, a refrigeration capacity corresponding to the heat of evaporation supplied must be applied in order to remove the heat of condensation. Particularly large cooling capacities are necessary in the case of evaporators which operate at low pressures and low temperatures. However, low temperatures and a low pressure are mandatory in the case of heat-labile substances and particularly biologically heat-sensitive substances in order to maintain at a minimum any degradation of the aforesaid substances during the concentration process.

In the industrial evaporation of large amounts of liquid, thin-layer evaporators, on which extensive literature exists ["Technische Mikrobiologic", Parey, Berlin-Hamburg, (1968) 196], and long-tube evaporators have proved particularly successful. Thin-layer evaporators are generally employed in practice, and operated with heating jacket temperatures of above 80°C. Contact between the substance being concentrated and the heating surface is sufficient to cause considerable losses of the desired substance through thermal decomposition when heat sensitive natural substances are being evaporated. Likewise, similar difficulties are encountered when long-tube evaporators are employed inasmuch as they employ very short contact times at temperatures of about 100°C.

In known concentration procedures with evaporators, even low molecular substances of natural origin are partially decomposed, with losses of up to 10% of the desired active substance and, in some cases, changes in the intrinsic colour of the substance being concentrated are induced. Substantially greater losses can arise when concentrating aqueous solutions of substances of high molecular weight, such as polypeptides and proteins.

Additionally, for example, in the large-scale industrial manufacture of 6-aminopenicillanic acid (6-APA), for example, 7% strength aqueous solutions have to be concentrated to a content of 28%. In the course thereof, for example, more than 6% of 6-APA decomposes under optimum operating conditions in the thin layer evaporator. Likewise, in the large-scale industrial manufacture of, for example, kallikrein or of the kallikreintrypsin inhibitor (KTI) by known processes, losses of 8–10% result.

Accordingly, a primary object of this invention resides in the provision of a novel process for the concentration of a heat-labile substance which minimizes losses of the desired heat labile substance through degredation.

A further object of the invention resides in the provision of a novel process for the concentration of any heat-labile substance whether of natural or synthetic origin, high or low molecular weight which is useful in the pharmaceutical sense as a drug, food or medicine, as well as precursors and intermediates therefor which minimizes losses of the desired heat labile substance through degration thereof.

THE INVENTION

In accordance with the invention a novel process for the freeze concentration of a crude aqueous solution of a heat-labile substance is provided which includes the steps of cooling a crude aqueous solution of heat labile substance to produce a frozen crude solution and a pre-cooled crude solution of said heat-labile substance, mixing said frozen crude solution and said pre-cooled solution with ice, to produce pure ice crystals and a first concentrated solution of said heat-labile substance and subsequently separating said pure ice crystals from said first concentrated solution of said heat-labile substance.

A further and preferred embodiment of the invention for the freeze concentration of a crude aqueous solution of a heat-labile substance which includes the steps of cooling a crude aqueous solution of heat-labile substance to produce a frozen crude solution and a pre-cooled crude solution of said heat-labile substance, mixing said frozen crude solution and said pre-cooled solution with ice to produce pure ice crystals and a first concentrated solution of said heat-labile substance separating said pure ice crystals from said first concentrated solution of said heat-labile substance further cooling said first concentrated solution to form further ice crystals and a second concentrated solution of said heat-labile substance, separating said further ice crystals from said second concentrated solution of said heat-labile substance and recycling said further ice crystals to the mixture of frozen crude solution and pre-cooled solution of said heat-labile substance.

As used herein, the term "heat-labile substance" is especially intended for reference to substances useful in the pharmaceutical sense as a drug, food or medicine, as well as precursors and intermediates therefor. It is immaterial whether such substances are of high or low molecular weight, of natural or synthetic origin as long as they are heat-labile. Representative of the types of heat labile substances contemplated in the practice of the invention are substances of biological origin such as polypeptides, proteins, antibiotis and the like.

With reference to the term heat labile as used herein it is intended to encompass those substances of the character described which decompose to a substantial extent wherein a crude aqueous solution containing the same is concentrated by the previously known methods referred to hereinabove. While it is not intended to be bound or restricted to any particular limits regarding the character of the heat labile substance contemplated as useful in the practice of the invention, it is contemplated that any substance which decomposes to a substantial extent a temperature of 55°C within one hour is generally to be regarded and considered as a heat-labile substance. With regard to the extent of decomposition at a temperature of 55°C in order to be considered a heat-labile substance and thus be considered within the scope of the invention it is generally regarded that decomposition losses of at least 10 weight percent and above of the original starting material qualifies the substance as heat-labile.

FIG. 1 represents a schematic flow-diagram of a preferred form of the invention, in which a crude solution of a heat-labile substance is continuously concentrated in a two-step circulatory process.

The crude solution 10 is pre-cooled in the pre-cooler 1. This pre-cooled crude solution is partially frozen on a rotary freezing device 2 at about −40°C and the frozen solution scraped off as scales. The scales of frozen solution thus obtained are mixed, in a mix crystallizer 3, with pre-cooled crude solution 10, and with the ice recycled from the second separation device 6. The dwell time in the mix crystalliser 3 is so chosen that the scales of frozen solution introduced can dissolve completely whilst at the same time pure ice crystals are formed. Thus, in the mix crystallizer pure ice crystals and a first concentrated solution of the substance are formed. The ice from the second stage 6 is added for better crystallization. After complete recrystallization in the mix crystallizer 3, the pure ice crystals are separated from the first concentrated solution 12 in the first separating device 4. The recycled pure ice 11 is used to pre-cool crude solution 10 in the pre-cooler 1 and is subsequently discarded. The first concentrated solution obtained is fed to a cooling-crystallization device 5 where a further concentration is achieved through the formation of ice crystals, to provide a second concentrated solution. In the second separating device 6, the second concentrated solution 13 and ice crystals are separated.

By the use, according to the invention, of the process just described, it is possible to concentrate aqueous solutions of heat labile substances, especially low molecular or higher molecular drugs and/or their precursors and intermediate products. Particular examples of such substances are enzymes (such as kallikrein, hyaluronidase and L-asparaginase) enzyme inhibitors (such as the kallikrein-trypsin inhibitor, hereinafter referred to as KTI) pancreas extracts, 6-aminopenicillanic acid (6-APA) and semi-synthetic penicillins manufactured therefrom, and other antibiotically active medicines.

In one run employing the process of the invention as just described, a 7% strength aqueous 6-APA solution was concentrated until it contained 28% of active substance. The loss of 6-APA which occurred in the ice was only 1.2%, whilst on concentrating a 6-APA solution in a thin layer evaporator of known type, losses of active substance of up to 6% occurred. Thus, by using freeze-concentration according to the invention, it is possible to isolate 6-APA in higher yields than according to the known processes.

Kallikrein and KTI are, like other proteins, very labile to heat. Thus, at 55°C more than 30% of kallikrein is inactivated within 1 hour. As a result, losses of up to 10% occur when concentrating kallikrein in a vacuum evaporator, even with short contact times. Against this, it is possible by the process according to the invention as just described to freeze-concentrate aqueous kallikrein solutions with a loss of only 0.8–1.4% and aqueous solutions of KTI with a loss of only 1.0%.

The application, according to the invention, of the continuous process which has already been described can also be extended to a corresponding discontinuous process if the second concentration stage in the scraping-cooler 5 is omitted. In this instance, the crude solution 10 is converted, on a rotary freezing device 2, into scales of frozen crude solution and these are mixed in the mix-crystallizer 3 with crude solution 10 which has been cooled but not frozen. Hereupon, the scales of frozen crude solution dissolve, and at the same time pure ice crystals are formed. The mixture of ice crystals and concentrated first solution is separated in a separating device 4. If the ice produced is rinsed with a little water it contains less than 1% of the amount of kallikrein-trypsin inhibitor employed. The wash liquid is again preferably frozen on the rotary freezing device 2 and recycled to the mix-crystallizer 3. The concentrate formed in the mix-crystallizer 3 can be concentrated in corresponding further stages.

The following Examples will serve to illustrate the practice of the invention wherein the bracketed reference numerals refer to FIG. 1 for convenience:

EXAMPLE 1

16.7 kg/hour of a 7% strength crude solution of 6-APA are fed to the freeze-concentration device described above. After pre-cooling in the pre-cooler 1, the crude solution is divided. 8,26 kg/hour are converted on the rotary freezing device 2 into scales of frozen solution at −30°C. These scales are mixed with 8.44 coolingcrystallization of the pre-cooled crude solution in the mix crystallizer 3. At the same time, pure ice crystals from the cooling-crystallization device 5 are introduced, as seed crystals, into the mix crystallizer 3 via the second separating device 6. The mixture resulting after the recrystallization in mix-crystallizer 3 has taken place is separated, in the first separating device 4, into a first concentrated solution and ice crystals. The ice crystals are used to pre-cool, in the pre-cooler 1, the crude solution which is to be concentrated, and are subsequently discarded. The ice contains 1.2% of the total amount of the 6-APA employed as a crude solution for freeze-concentration.

The 8.35 kg/hour of the first concentrated solution, which contains 14% of 6-APA, are fed to the scraping-cooler 5 at a jacket temperature of −15°C. The mixture produced in 5 is separated, in the second separating device 6, into its components, namely pure ice crystals and second concentrated solution. A part of the ice produced, 4.18 kg/hour, is fed back into the mix crystallizer 3. 4.18 kg/hour of second concentrated solution containing 28% of 6-APA are obtained as final concentrate. The analysis of the final concentrate shows a 6-APA content of 98% relative to the 6-APA contained in the crude solution fed in.

6-APA is isolated from the final concentrate by precipitation at the iso-electric point in accordance with known methods. The yield of crystallized product is 94%, relative to the content of the crude solution employed. The mother liquor resulting therefrom contains a residual 4% of 6-APA.

EXAMPLE 2

21.5 kg/hour of a crude solution of KTI containing 0.2% of active substance are fed hourly to the freeze-concentration device described above. After pre-cooling to 0°C, in the precooler 1, the crude solution is divided. 9.27 kg/hour of crude solution are converted, on the rotary freezing device 2, into frozen scales the temperature of which is −30°C. These scales are mixed with 12.23 kg/hour of the pre-cooled crude solution of the KTI in the mix-crystallizer 3. At the same time, some of the pure ice crystals which are continuously produced in the second separating device 6 are fed to the mix crystallizer 3. The mixture resulting after recrystallization is separated, in the first separating device 4, into first concentrated solution and pure ice crystals. The ice crystals are used to cool the crude solution of the KTI in the pre-cooler 1. The pure ice contains 1.1% of the total amount of the kallikrein-trypsin inhibitor employed. The 10.75 kg/hour of first concentrated solution containing 0.4% of KTI are divided. 4.65 kg are frozen to −30° on a scale-forming roller and 6.10 kg of preconcentrate are recrystallized in a mix crystallizer 3 as described above. The mixture is separated in a separating device. 5.38 kg of final concentrate containing 0.8% of KTI, and 5.37 kg of ice, are obtained.

EXAMPLE 3

9.0 kg of a crude solution of the kallikrein-trypsin inhibitor (KTI) containing 6,700 KIU/ml are pre-cooled to 0°C in the pre-cooler 1. 3.89 kg of this crude solution are converted on the rotary freezing device 2 into scales of frozen solution, which are at a temperature of −30°C. The scales are mixed with 6.11 kg of the pre-cooled crude solution in the mix crystallizer 3, with simultaneous addition of about 0.7 of pure ice scales. After 40 minutes the mixture of concentrated solution and ice crystals is separated into its components in the separating device 4. A first concentrate containing 13,400 KIU/ml is obtained. The concentrate first thus obtained is recycled to the freeze-concentration process. The ice produced contains less than 1% of the amount of KTI employed and is discarded. The washings are converted to ice scales on the rotary freezing device 2 and recycled to the process. In the second concentration stage, 1,94 kg of product ice scales are mixed, in the mix crystallizer 3, with 2.56 kg of first concentrate and 0.35 kg of the ice scales produced from the wash solution. After 40 minutes the mixture is separated into its solid and liquid components. A final concentrate with an active substance content of 26,800 KIU/ml is obtained.

EXAMPLE 4

14.3 kg/hour of an eluate of a metal salt precipitate, obtained according to German Patentschrift No. 910 580 and having an active substance content of 95 KU (kallikrein units) /ml are fed to the freeze-concentration device. This crude solution is pre-cooled to 0°-1°C in the pre-cooler 1 and is then divided. 6.17 kg/hour are converted on the rotary freezing device 2 into frozen scales at −30°C. These scales are mixed, in the mix crystallizer 3, with the remaining 8.13 kg/hour of the pre-cooled crude solution. At the same time, 1.0 kg/hour of the ice crystals which are produced in the second separating device 6 are fed to the mix crystallizer 3. The mixture resulting after the recrystallization is separated, in the first separating device, into first concentrated solution and ice crystals. The ice crystals contain 1.4% of the total kallikrein units employed; they are used for cooling the crude solution to be concentrated, in the pre-cooler 1, and are then discarded. The first concentrated solution is obtained in an amount of 7.15 kg/hour and contains 190 KU/ml. The first concentrated solution is crystallized in the scraping-cooler 5 at a jacket temperature of −15°C. The mixture of further concentrated solution and ice crystals thereby produced is separated in the second separating device 6 into its components, namely second concentrated solutions and pure ice crystals. The ice produced, 3.57 kg/hour, is fed to the mix crystallizer 3. 3.57 kg/hour, of second concentrated solution, containing 380 KU/ml, are obtained as the concentrate. This corresponds to a yield of units of 97.5% relative to the crude solution.

EXAMPLE 5

18.4 kg/hour of an eluate from the metal salt precipitation, obtained according to German Patentschrift No. 910 580 and dialysed against water, and having an active substance content of 63 KU (kallikrein units)/ml, are fed to the freeze-concentration device. This crude solution is pre-cooled to 0°C in the pre-cooler 1. 7.88 kg/hour of the pre-cooled crude solution are frozen into scales at −30°C on the rotary freezing device 2 and are then mixed, in the mix crystallizer 3, with the remaining 10.52 kg/hour of the pre-cooled crude solution. At the same time, 2.5 kg/hour of the ice crystals produced in the second separating device 6 are also fed to the mix crystallizer 3. After recrystallization has taken place, the mixture is separated into first concentrated solution and ice crystals in the first separating device. The ice crystals contain 0.8% of the kallikrein units introduced and are used for cooling the crude solution in the pre-cooler 1 and then discarded. The 9.2 kg/hour of first concentrated solution contain 126 KU/ml and are crystallized in the scraping-cooler at a jacket temperature of −15°C. The concentrate/ice crystal mixture thereby produced is separated into its components, namely second concentrated solution and pure ice crystals, in the second separating device 6. The pure ice crystals are fed to the mix crystallizer 3 in an amount of 2.5 kg/hour. The second concentrated solution is obtained in an amount of 4.6 kg/hour and contains 252 KU/ml. The yield in terms of units — relative to the crude solution — is 99%.

It is obvious that various modifications and variations of the invention will occur to those skilled in the art based on the above description of the invention and exemplary disclosure; therefore, it is intended that all such modifications and variations of the invention be included within the scope of the invention as defined in the appended claims.

What is claimed is:

1. A process for the freeze concentration of a crude aqueous solution of a heat-labile substance which includes the steps of cooling a crude aqueous solution of a heat-labile substance to produce a frozen crude solution and a pre-cooled solution of said heat-labile substance, mixing said frozen crude solution and said pre-cooled solution with ice, to produce pure ice crystals and a first concentrated solution of said heat-labile substance and separating said pure ice crystals from said first concentrated solution of said heat-labile substance said heat-labile substance being capable of decomposing, at a temperature of 55°C in 1 hour to an extent of at least 10% loss by weight.

2. A process for the freeze concentration of a crude aqueous solution of a heat-labile substance which includes the steps of cooling a crude-aqueous solution of heat-labile substance to produce a frozen crude solution and a pre-cooled crude solution of said heat-labile substance, mixing said frozen crude solution and said pre-cooled solution with ice to produce pure ice crystals and a first concentrated solution of said heat-labile substance separating said pure ice crystals from said first concentrated solution of said heat-labile substance further cooling said first concentrated solution to form further ice crystals and a second concentrated solution of said heat-labile substance, separating said further ice crystals from said second concentrated solution of said heat-labile substance and recycling said further ice crystals to the mixture of frozen crude solution and precooled solution of said heat-labile substance said heat-labile substance being capable of decomposing at a temperature of 55°C in 1 hour to an extent of at least 10% loss by weight.

3. The process according to claim 1 wherein the heat-labile substance is 6-aminopenicillanic acid.

4. The process according to claim 1 wherein the heat-labile substance is kallikrein-trypsin inhibitor.

5. The process according to claim 1 wherein the heat-labile substance is a metal salt of kallikrein.

6. The process according to claim 1 wherein the heat-labile substance is L-asparaginase.

7. The process according to claim 1 wherein the heat-labile substance is hyaluronidase.

8. The process according to claim 1 wherein the heat-labile substance is enzyme.

9. The process according to claim 1 wherein the heat-labile substance is enzyme inhibitors.

10. The process according to claim 1 wherein the heat-labile substance is extracts of pancreas.

11. The process according to claim 1 wherein the heat-labile substance are penicillins.

12. The process according to claim 1 wherein the heat-labile substance is a semi-synthetic penicillin.

13. The process according to claim 1 wherein the heat-labile substance is high and low molecules weight, protein and polypeptides.

* * * * *

UNITED STATES PATENT OFFICE
CERTIFICATE OF CORRECTION

Patent No. 3,897,409  Dated July 29, 1975

Inventor(s) Fritz Huper et al

It is certified that error appears in the above-identified patent and that said Letters Patent are hereby corrected as shown below:

Column 4, line 17, delete "coolingcrystallization" and insert --kg/hour--.

Signed and Sealed this sixth Day of January 1976

[SEAL]

Attest:

RUTH C. MASON
Attesting Officer

C. MARSHALL DANN
Commissioner of Patents and Trademarks